(12) United States Patent
Schuller et al.

(10) Patent No.: US 10,466,365 B2
(45) Date of Patent: Nov. 5, 2019

(54) SATELLITE-BASED DETERMINATION OF A MOTOR VEHICLE IN A COVERED AREA

(71) Applicant: Audi AG, Ingolstadt (DE)

(72) Inventors: Florian Schuller, Ismaning (DE); Florian Haubner, Willanzheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/061,322

(22) PCT Filed: Dec. 7, 2016

(86) PCT No.: PCT/EP2016/079975
§ 371 (c)(1),
(2) Date: Jun. 11, 2018

(87) PCT Pub. No.: WO2017/097794
PCT Pub. Date: Jun. 15, 2017

(65) Prior Publication Data
US 2019/0204454 A1 Jul. 4, 2019

(30) Foreign Application Priority Data
Dec. 11, 2015 (DE) .................. 10 2015 016 045

(51) Int. Cl.
*G01S 19/42* (2010.01)
*G01C 21/20* (2006.01)
*G01S 11/06* (2006.01)

(52) U.S. Cl.
CPC ............ *G01S 19/42* (2013.01); *G01C 21/206* (2013.01); *G01S 11/06* (2013.01)

(58) Field of Classification Search
CPC ........ G01S 19/42; G01S 11/06; G01C 21/206
See application file for complete search history.

(56) References Cited

U.S. PATENT DOCUMENTS

| | | | | |
|---|---|---|---|---|
| 4,949,268 A | * | 8/1990 | Nishikawa | G01C 21/28 340/995.1 |
| 7,979,203 B2 | | 7/2011 | Haag et al. | |
| | | | (Continued) | |

FOREIGN PATENT DOCUMENTS

| | | |
|---|---|---|
| CN | 101441262 A | 5/2009 |
| CN | 104764480 A | 7/2015 |

(Continued)

OTHER PUBLICATIONS

International Preliminary Report on Patentability directed to related International Patent Application No. PCT/EP2016/079975, dated Mar. 26, 2018, with attached English-language translation; 20 pages.

(Continued)

*Primary Examiner* — Genna M Mott
(74) *Attorney, Agent, or Firm* — Sterne, Kessler, Goldstein & Fox P.L.L.C.

(57) ABSTRACT

Apparatus, systems, and methods are disclosed relating to a position determination system for a motor vehicle for ascertaining whether the motor vehicle is located in an area covered by a ceiling element of a structure, comprising: a receiver unit, which is designed to receive navigation signals of a plurality of satellites of one or more global navigation satellite systems and to detect a change in signal strength, over time, of the respective navigation signals. An evaluation unit ascertains lines of sight from the motor vehicle to the respective satellites from which navigation signals were received, evaluates the change in signal strength, over time, of the respective navigation signals relative to the respective ascertained line of sight, and ascertains that the motor vehicle is entering the covered area by correlating a driving motion of the motor vehicle with the respective lines of sight.

19 Claims, 3 Drawing Sheets

(56) References Cited

U.S. PATENT DOCUMENTS

| | | | |
|---|---|---|---|
| 8,423,276 B2 | 4/2013 | Judd | |
| 9,562,772 B2 | 2/2017 | Zalewski et al. | |
| 2001/0043738 A1* | 11/2001 | Sawhney | G01S 5/163 |
| | | | 382/154 |
| 2013/0278466 A1* | 10/2013 | Owen | G01S 1/02 |
| | | | 342/464 |
| 2013/0285849 A1 | 10/2013 | Ben-Moshe et al. | |
| 2013/0332064 A1 | 12/2013 | Funk et al. | |
| 2016/0377731 A1 | 12/2016 | Garg et al. | |
| 2017/0068001 A1* | 3/2017 | Chhokra | G01S 19/40 |

FOREIGN PATENT DOCUMENTS

| | | |
|---|---|---|
| DE | 102007020434 A1 | 10/2008 |
| DE | 102008056907 A1 | 5/2010 |
| DE | 102012223970 A1 | 7/2014 |
| EP | 0429783 A2 | 6/1991 |
| KR | 20130006019 A | 1/2013 |
| WO | WO 00/49680 A1 | 8/2000 |

OTHER PUBLICATIONS

International Search Report and Written Opinion of the International Searching Authority directed to related International Application No. PCT/EP2016/079975, dated May 4, 2017, with attached English-language translation; 32 pages.

\* cited by examiner

SATELLITE-BASED DETERMINATION OF A MOTOR VEHICLE IN A COVERED AREA

TECHNICAL FIELD

This disclosure relates to a position determination system for a motor vehicle and a method for determining whether the motor vehicle is located in an area covered by a ceiling element of a structure. This disclosure also relates to a motor vehicle having such a position determination system.

BACKGROUND

Global navigation satellite systems (GNSS) have been used primarily for position determination for navigation purposes. In essence, such systems are based on the propagation time measurement to different satellites. At least four satellites must be visible at any point in time to be able to reliably and unambiguously determine a position. The receiver is able to determine its own position from the position of the satellite and the signal propagation times.

In general, distance-transmitting sensors, which are upwardly oriented and are thereby able to directly establish whether an obstacle is present within the range above the vehicle that can be interpreted as a ceiling, are used for detecting ceilings, or roofing. Such information can be used, for example, to assess an ambient temperature value obtained using a temperature sensor, and to not use potentially encountered milder ambient temperatures, occurring temporarily when traveling through a tunnel, as a basis for a range prediction by the on-board computer.

The identification of a route that is covered overhead can be used for a wide variety of comfort functions. In this context, a control system for a vehicle having a navigation system for detecting a current position of the vehicle and further having a control unit coupled to the navigation system is known from DE 10 2008 056 907 A1. In DE 10 2008 056 907 A1, at least one vehicle component can be activated, using the control unit, as a function of the current position of the vehicle, and at least one global position of the vehicle can be predefined by a user. According to one disclosed embodiment of DE 10 2008 056 907 A1, the navigation system may identify when a route that is covered overhead, such as a tunnel, is about to be traversed, and an information signal indicating this traversing can be transmitted from the navigation system to the control unit. The control unit can then use this information signal to activate the at least one vehicle component.

At present, a large number of vehicles are not equipped with sensors that are upwardly oriented. As a result, the ceiling or roofing cannot be reliably detected.

Additional sensors, which are provided for the purpose of detecting the ceiling, incur additional costs and usually offer advantages in a limited number of situations. If the sensors are dispensed with, a ceiling cannot be identified, and a garage parking space thus cannot be validated even after the parking process. Such a function is required, for example, for automatically parking the vehicle in a garage. A vehicle user can leave the vehicle and start the garage parking function of the vehicle. The vehicle can then park itself within a limited perimeter, the extent of which can be predefinable, search for the garage, and park in the garage. Due to a lack of sensors in many presently available vehicles, a failure of the parking process cannot necessarily be detected. This is because such sensors could be used to validate the success of the automatic parking process in the garage by providing a piece of "ceiling above vehicle" information. It could be possible, for example, that the vehicle simply comes to a halt between two houses because the contour of the houses is misidentified as a garage by conventional vehicle sensor systems. Moreover, conventional distance-transmitting sensors can frequently supply faulty detections when the vehicle is being parked under a tree, for example. If only a few sensors are present, it is possible for many detected objects to be erroneously identified as ceilings.

Furthermore, a method for operating a device, in particular a navigation device for a motor vehicle, is known from DE 10 2007 020 434 A1. The device includes a processor, a signal receiver for receiving position signals, in particular GPS signals, a road network database, which also includes position data on tunnels (tunnel attributes), a position ascertaining unit, which determines the current position of the vehicle, a display unit, and a display controller for controlling the settings of the display unit, in particular for regulating the brightness and/or a color scheme of the display unit. The display controller is able to vary the setting of the display unit when driving through a tunnel (tunnel mode). The method includes the steps of ascertaining the vehicle position, taking the received position signals into consideration, and automatically activating the tunnel model of the display unit using the display controller, immediately or with a certain time delay, when the ascertained vehicle position includes a tunnel attribute, and the received position signals drop below a predefined signal quality. In this way, a GNSS receiver, which is already present in many vehicles, can be used to detect ceilings or covered areas and/or when these are entered and/or exited.

However, this method has the disadvantage of being dependent on an available road network database and being applicable only to accordingly expansive structures, such as tunnels, in which the loss of the GPS signal, and the drop below the predefined signal quality associated therewith—as claimed in DE 10 2007 020 434 A1—are very suitable for reliably identifying the entering of a tunnel.

For the determination of a position of a vehicle when GNSS signals are shielded, for example in a parking garage, a method is known in this context from DE 10 2012 223 970 A1 for determining initial data for the determination of position data of a vehicle based on vehicle dynamics data. The method includes the steps of associating a defined ambient condition with a defined position of the vehicle, detecting an ambient condition, and using the defined position as initial data if a comparison of the detected ambient condition and the defined ambient condition satisfies a predetermined condition.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
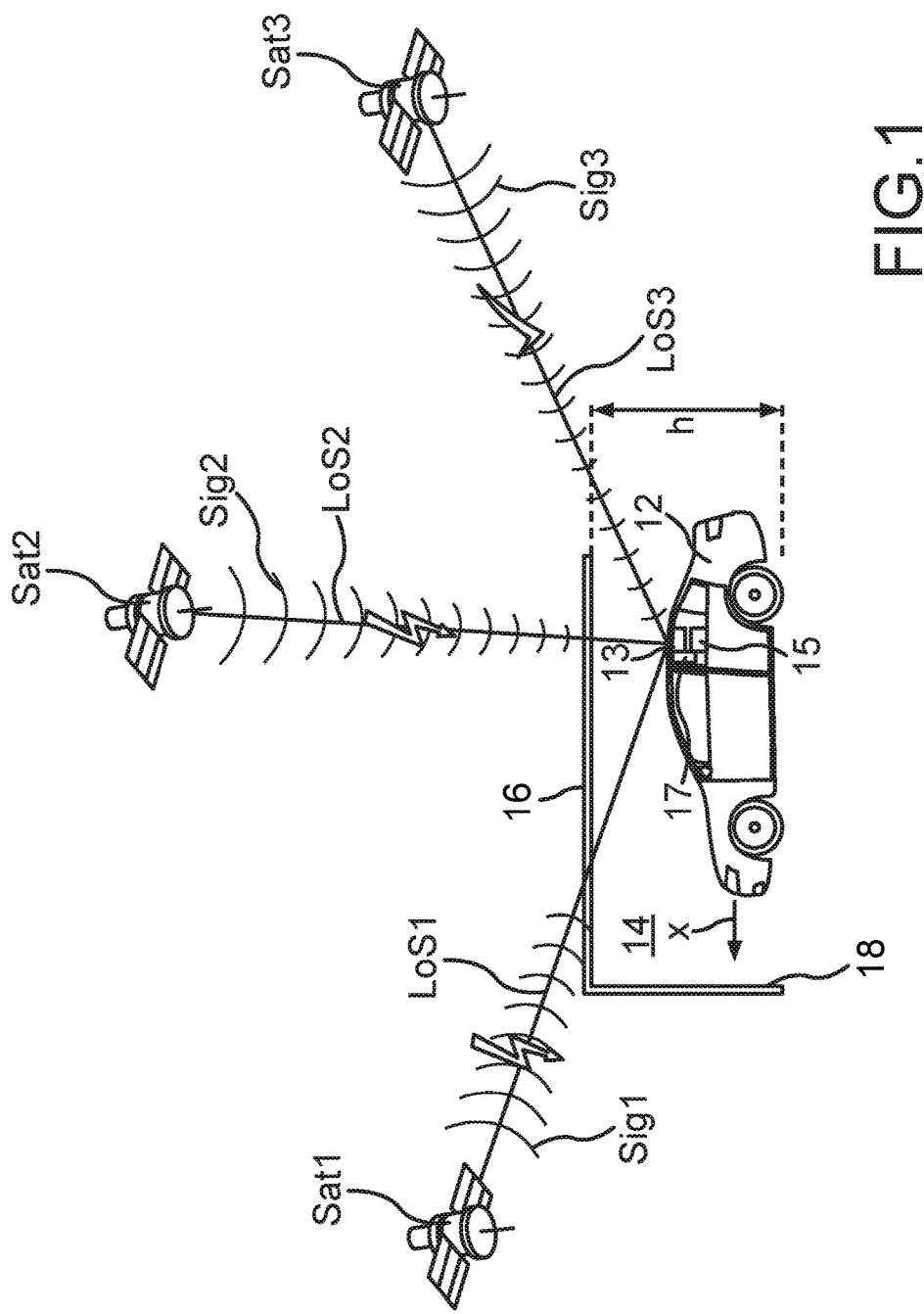
FIG. 1 illustrates a simplified schematic illustration of a motor vehicle when entering a garage, according to a first exemplary embodiment.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A position determination system for a motor vehicle, a motor vehicle, and a method are disclosed to ascertain, in a way usable for many applications, whether a motor vehicle is located in an area covered by a ceiling element of a structure.

This disclosure is directed to a position determination system for a motor vehicle for ascertaining whether the motor vehicle is located in an area covered by a ceiling element of a structure. In some embodiments, the system includes a receiver unit, which is designed to receive navigation signals of a plurality of satellites of one or more global navigation satellite systems, and to detect a change in signal strength over time of the respective navigation signals. In some embodiments, the position determination system further includes an evaluation unit, which is designed to ascertain lines of sight from the motor vehicle to the respective satellites from which navigation signals were received, to evaluate the change in signal strength over time of the respective navigation signals relative to the respective ascertained line of sight, and to ascertain that the motor vehicle is entering the covered area by correlating a driving motion of the motor vehicle with the respective lines of sight.

The motor vehicle can be a vehicle having an internal combustion engine and/or an electric motor, and in particular an electric vehicle or a hybrid vehicle. The structure may be a tunnel, a garage, or a parking garage, for example. The ceiling element can be made of reinforced concrete, for example. The satellites can be arbitrary satellites of presently available and future global navigation satellite systems such as GPS (global positioning system) of the United States of America, GLONASS (global navigation satellite system) of the Russian Federation, Galileo of the European Union, or Beidou of the People's Republic of China.

In some embodiments, the receiver unit is designed to receive the navigation signals of different satellites of different global navigation systems, and the evaluation unit is designed to ascertain the associated lines of sight for all received navigation signals. A line of sight shall be understood to mean the connecting line between an antenna of the receiver unit and a transmitting antenna of the respective satellite.

Conventional position determination systems for a motor vehicle only partially utilize the navigation signals provided by a global navigation satellite system, but additional usage options can be achieved, especially for use in a motor vehicle, by appropriately evaluating the navigation signals. A sensor, or the receiver unit in some embodiments, for example in the form of a conventional GPS receiver, can provide additional pieces of information. This information, would be helpful for identifying a garage or a tunnel, or it could be used for general detection purposes. An associated method can be implemented by an extension of the software, and additional hardware is not necessarily required for this purpose. It may be provided, for example, that the evaluation unit is implemented as a software module in an existing GNSS device. In this way, the GNSS receiver, which is already present in many vehicles, can be used to detect ceilings or covered areas and/or determine when these are being entered and/or exited.

For this purpose, it may be provided that all visible satellites are tracked based on the orbit data thereof, and the lines of sight to the satellites are calculated at regular intervals. Over short time periods, the positions of the satellites can be assumed to be constant, given the large distance and the orbital period of approximately twelve hours, because this use of the data does not require the data to be highly precise. As soon as a satellite is no longer available or the signal strength of the associated navigation signal has sufficiently decreased, the related reason for the signal degradation can be estimated. Possible reasons include, for example, disappearance under the visible horizon or blockage by buildings or a ceiling, which impairs the link to the satellite. In contrast to an evaluation, known from the prior art, of only the signal quality of the available navigation signals, optionally taking the number of receivable satellites into consideration, it is possible to ascertain with higher accuracy that the motor vehicle is entering the covered area by correlating the driving motion of the motor vehicle with the respective lines of sight. Of course it is also possible to ascertain with accordingly high accuracy that the motor vehicle is exiting the covered area when the lines of sight are available, for example, as a result of being ascertained prior to the motor vehicle entering a covered area or being provided in another manner, for example, via the GSM mobile communication network in what is known as the assisted global positioning system (A-GPS). In particular, the so-called almanac can be transmitted in this way.

According to an advantageous embodiment, the evaluation unit is designed to ascertain a respective azimuth angle of the position of the respective satellite relative to the motor vehicle. For the correlation of the driving motion with the respective lines of sight, the evaluation unit is designed to ascertain a respective angular difference between the respective azimuth angle and a driving azimuth angle, which is correlated with the direction of the longitudinal axis of the motor vehicle and/or the direction of a tangent to a trajectory formed by the driving motion. Such an angular difference, in particular, is unsigned, which is to say that only the absolute value of the angular difference is considered and evaluated. The evaluation unit can furthermore be designed to carry out the evaluation as a function of the angular difference; in other words, the evaluation unit can be designed to evaluate the change in signal strength over time of the respective navigation signals as a function of the associated angular difference, and to identify that the motor vehicle is entering a covered area when the change in signal strength over time is initially detected at small angular differences and, over the further course, shifts toward larger angular differences. In this way, a chronological sequence in the signal reduction as a function of the angular difference is analyzed for ascertaining that the motor vehicle is entering the covered area.

The azimuth angle can be fixedly based on a geographic coordinate system, for example, as what is known as a south azimuth or what is known as a north azimuth. This has the advantage that only the respective azimuth angles of the satellites have to be determined, along with an azimuth angle, which is based on the geographic coordinate system, of the direction of the vehicle longitudinal axis or of the direction of the tangent to a trajectory formed by the driving motion. The corresponding angular differences are then derived in each case from the absolute difference between the respective azimuth angle and the driving azimuth angle. Likewise, the respective azimuth angles of the satellites can be based on the vehicle, and thus an azimuth angle of 0° and/or 360° can denote a satellite position in which the satellite in question is located exactly ahead in the direction of the driving motion of the motor vehicle. In this case, instead of a single azimuth angle, this being the driving azimuth angle, each of the respective azimuth angles of the satellites must be tracked, which can mean added complexity for the evaluation unit from a programming point of view. The selection of the reference system, however, has no influence whatsoever on the applicability of this disclosure.

According to a further advantageous embodiment, the evaluation unit is designed to identify that the motor vehicle is entering the covered area when a decrease in the signal strength of a satellite is detected by a predefinable factor. In this case, the satellite is located, relative to the position of the motor vehicle on the earth's surface in the vicinity of the zenith, preferably within a conical region having a half opening angle of 30° around the zenith, and in particular having a half opening angle of 20°. In this way, a satellite that is located in the vicinity of the zenith over the motor vehicle can decisively help to increase the accuracy of the detection of ceilings. If the link to such a satellite is interrupted or the signal strength is severely impacted, the likelihood of a ceiling over the motor vehicle is high. A satellite located substantially perpendicularly over the motor vehicle thus allows very precise detection of a ceiling over the vehicle. The ceiling blocks the corresponding navigation signal in the covered area, due to the very steep line of sight, which ideally is at an angle of 90° (perpendicular) with respect to the earth's surface. Thus, substantially perpendicular projection of the signal blockage caused by the ceiling element occurs on the motor vehicle.

A half opening angle shall be understood to mean the angle that is enclosed between the zenith and any arbitrary half-line delimiting the conical region and starting with the motor vehicle.

According to a further advantageous embodiment, the position determination system includes a prediction unit, which is designed to predict, as a function of a predefinable target position within the structure, in particular a garage, a decrease in the signal strength of the respective navigation signals at the target position in relation to the signal strength of the respective navigation signals just before the motor vehicle starts to assume the target position. A target position shall be understood to mean a combination of the target location and the orientation of the motor vehicle in the target location. In particular, this can be the automatic estimation of the target position by the motor vehicle, which supports an automated parking process. In combination with the parking process, it is thus possible, even before the parking process, to provide an approximate prediction of the impairments to the links to the different satellites, based on the target position and the known position of the garage. If this prediction takes place with a predefinable permitted deviation, the parking facility can be validly considered to be a covered (garage) parking facility.

According to an advantageous embodiment, the evaluation unit is designed to ascertain, in cooperation with the prediction unit, how far the motor vehicle has already driven into the structure, particularly a garage. In this way, it is possible to estimate how far into the garage the motor vehicle is already located. Ideally, the largest possible number of global navigation satellite systems (GNSS) is combined with the respective available satellites so as to have as large a number of satellites as possible available, and thereby achieve very high accuracy. For example, the use of three different global navigation satellite systems already results in at least twelve visible satellites.

According to a further advantageous embodiment, the evaluation unit is designed to ascertain, at least approximately, the height of an entrance opening after the motor vehicle has completely entered through the entrance opening of the structure. In particular, this can be the clearance height of the entrance opening. Ideally and when using different global navigation satellite systems, it would thus even be possible to achieve an approximate estimation of the height of the garage entrance, generally after a parking process has been completed. The accuracy of such an estimation depends, in particular, on the number of receivable satellites, and in particular on a favorable configuration of the satellites with respect to one another, for example, multiple satellites that are visible at different elevation angles opposite the entrance direction of the structure (garage). Data obtained in this way about a height of an entrance opening of a structure, for example, of a covered parking facility (parking deck, parking garage), can be provided to other motor vehicles, for example, via a suitable data link. In this way, it is possible to provide associated attributes for the structures in question for entry into corresponding map material suitable for navigation purposes, such as Google Maps. In particular, associated attributes can be in the form of a maximum vertical clearance, whereby drivers of other motor vehicles are able to identify in advance whether it is even possible to head for such a structure for parking purposes with the vehicle presently in use. Such vertical clearance data can preferably be provided when appropriate satellite configurations are present. As an alternative or in addition, a respective measured value (estimated value) can be transmitted together with a rating factor that indicates the reliability or accuracy with which this measured value was ascertained. In this way, initially comparatively imprecise vertical clearance measured values can be optimized over time and can be verified by different motor vehicles, having potentially different assembly heights of the antenna used for receiving the navigation signals.

According to a further advantageous embodiment, the evaluation unit is designed to assign each of the received satellites to a respective zone of at least one first zone, second zone, and third zone, as a function of the ascertained lines of sight. Further, the evaluation unit is designed to identify the entrance into a structure, and in particular a tunnel, when initially the signal strength of the respective navigation signals of the satellites assigned to the first zone decreases and, over the further course, the signal strength of the respective navigation signals of the satellites assigned to the second zone decreases.

Preferably, satellites that are located in the driving direction, and in particular satellites located deep over the horizon, can be assigned to the first zone. Satellites located laterally with respect to the motor vehicle, particularly satellites located transversely to the driving direction, can be assigned to the second zone. Preferably, satellites located opposite the driving direction can be assigned to the third zone. Likewise, a fourth zone may be defined, to which satellites are assigned that are located behind the motor vehicle and deep over the horizon. In this way, it is possible to define specific patterns for entering a tunnel, for example, based on which links to the satellites vary. For example, it is to be expected that the links to satellites having positions in the driving direction deep over the horizon (first zone) will be impaired first. Next, the links to lateral satellites and likewise to satellites at higher positions will be impaired; these satellites may be assigned to the second zone. Lastly, the links to satellites having positions, relative to the vehicle, opposite the driving direction (third zone) will be affected. Even later still, the links to satellites additionally located deep over the horizon (fourth zone) will be affected. Some embodiments can, in particular, also still be used when no map data is known for the vehicle position. Rather, the embodiments can provide the position of a structure, particularly a tunnel, for example, relative to the position of the motor vehicle.

Preferably, a motor vehicle can include a position determination system as disclosed below.

According to an advantageous embodiment, the motor vehicle includes an environmental sensor for providing environmental data as a function of a detection of objects located ahead in the driving direction, wherein the evaluation unit is designed to merge lines of sight and signal strengths of the respective satellites with the environmental data. The environmental sensor can preferably be a camera, particularly a front camera. As an alternative or in addition, the environmental sensor can include a radar sensor. Such sensors are usually designed to detect objects located in the horizontal direction with respect to the motor vehicle. Additional sensors, which are provided for the purpose of detecting the ceiling, incur additional costs and usually offer advantages in a limited number of situations. If such vertically oriented sensors are dispensed with, a ceiling cannot be identified according to the prior art, and a garage parking space thus cannot be validated even after the parking process. Conventional distance-transmitting sensors can frequently supply faulty detections when the vehicle is parked under a tree, for example.

By merging environmental data, which is formed by an environmental sensor having a horizontal detection characteristic, particularly a substantially horizontal detection characteristic, and configured for use with other systems in the motor vehicle, such as a lane-keeping assist system, a combined evaluation of the environmental data, with the lines of sight to the satellites and the respective progression of the signal strength, over time, of the respective navigation signals, allows the accuracy of the detection of a covered area to be further increased. Using a camera, it is thus possible, for example, to distinguish between a covered garage and a parking space underneath a tree, where two considerably taller vehicles (for example, delivery vans or light trucks) are already parked on the two neighboring parking spaces to the left and right of the available parking spot, the heights of these vehicles being considerably taller than the height of the vehicle heading for the available parking spot.

This disclosure also relates to a method for determining whether a motor vehicle is located in an area covered by a ceiling element of a structure, by receiving navigation signals of a plurality of satellites of one or more global navigation satellite systems and detecting a lateral change in signal strength of the respective navigation signals. Some embodiments of the method include ascertaining lines of sight from the motor vehicle to the respective satellite from which navigation signals were received, evaluating the change in signal strength, over time, of the respective navigation signals relative to the respective ascertained line of sight, and determining that the motor vehicle is entering the covered area by correlating a driving motion of the motor vehicle with the respective lines of sight.

The advantages and preferred embodiments described for the position determination system also apply to the motor vehicle disclosed herein. Likewise, the advantages and features, as well as the embodiments, described for the devices of the system similarly apply to the corresponding method, and vice versa. Consequently, corresponding method features can be provided for device features, and vice versa.

The features and feature combinations provided above in the description, and the features and feature combinations provided hereafter in the description of the figures and/or shown in the figures, can be used not only in the respective indicated combination, but also in other combinations, or alone, without departing from the scope of the invention. As a result, embodiments that are not explicitly shown or described in the figures, but that, as a result of separate feature combinations, can be derived from and implemented based on the provided description, shall also be considered to be disclosed by the invention.

Further advantages and features will be apparent based on the following description of exemplary embodiments, taking the accompanying figures into consideration. In the figures, identical features and functions are denoted by identical reference numerals.

Figure 2:
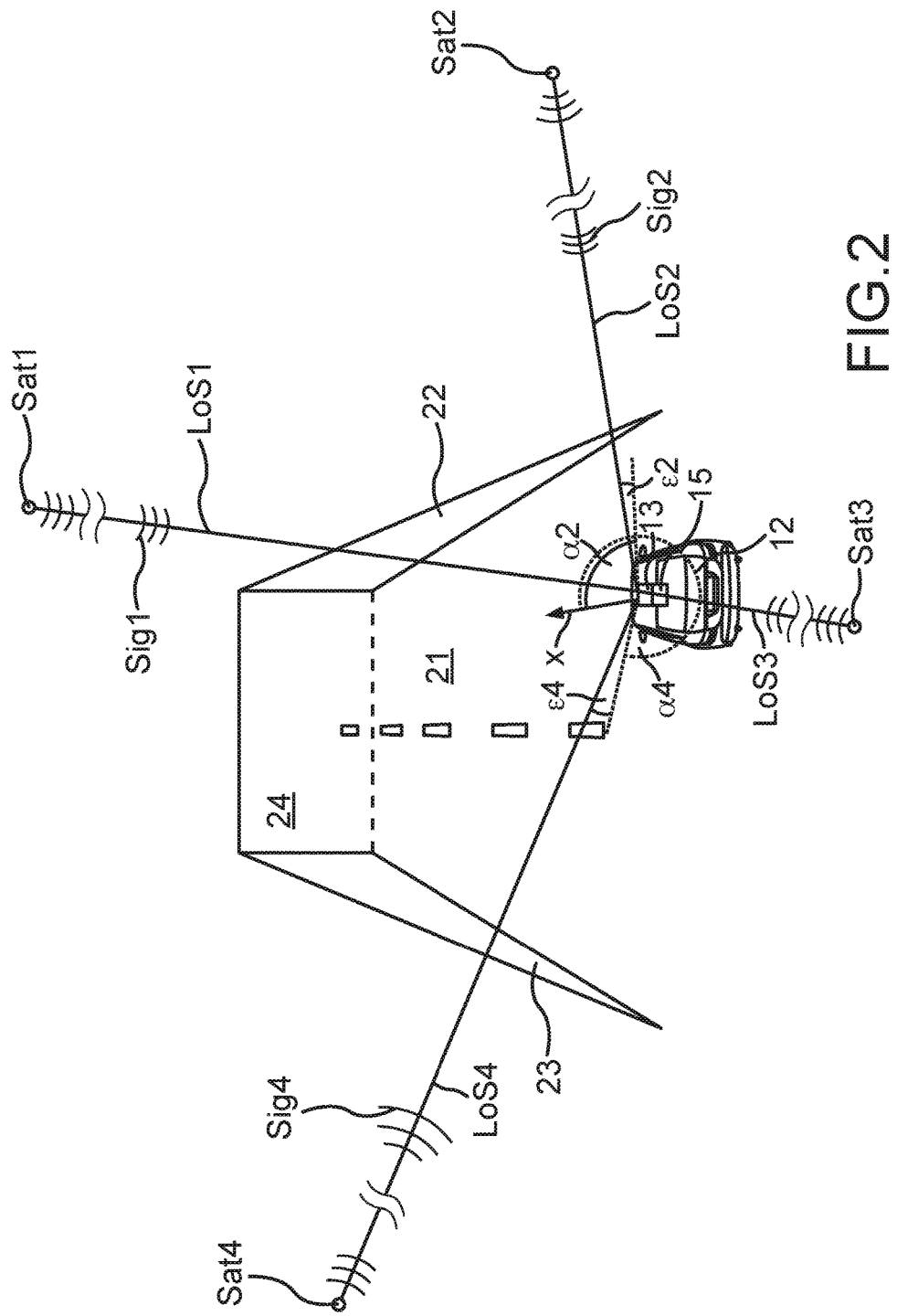
FIG. 2 illustrates a simplified schematic illustration of a motor vehicle when entering a tunnel, according to a second exemplary embodiment.
Figure 3:
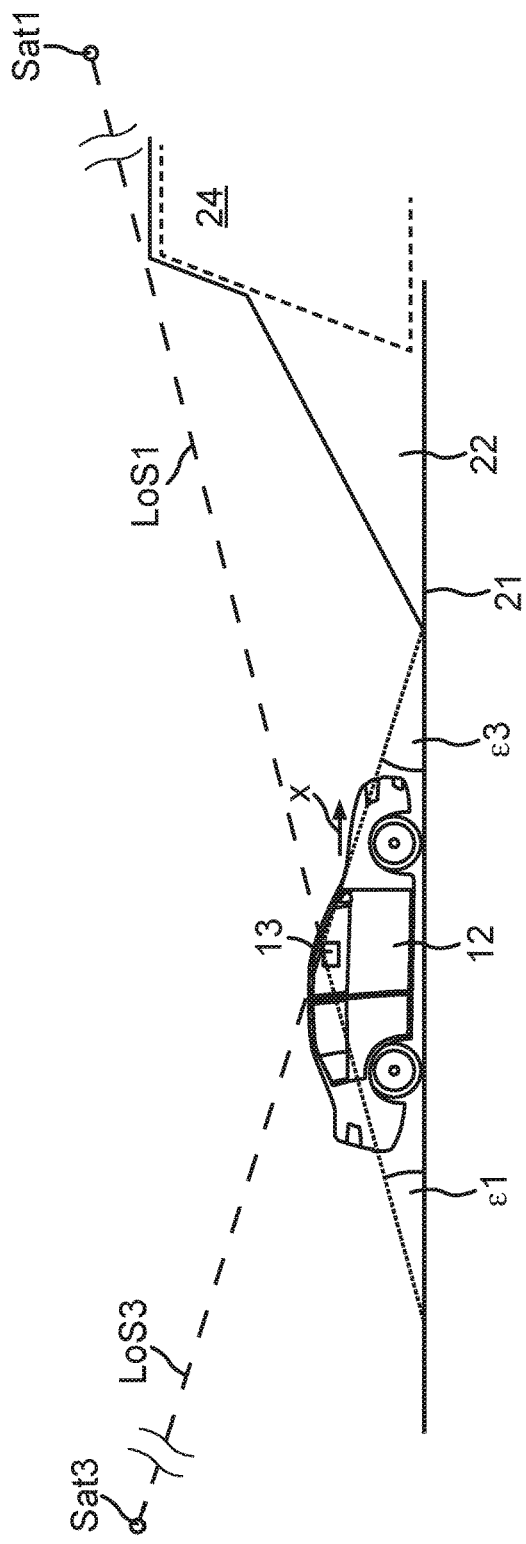
FIG. 3 illustrates a simplified schematic illustration of the motor vehicle entering a tunnel, according to the illustration from FIG. 2 from a lateral perspective.

In the drawings:

FIG. 1 shows a simplified schematic illustration of a motor vehicle when entering a garage, according to a first exemplary embodiment;

FIG. 2 shows a simplified schematic illustration of a motor vehicle when entering a tunnel, according to a second exemplary embodiment; and FIG. 3 shows a simplified schematic illustration of the motor vehicle entering a tunnel, according to the illustration from FIG. 2 from a lateral perspective.

As illustrated in FIG. 1, when a motor vehicle 12 enters a garage 14, the motor vehicle 12 carries out a driving motion x. The motor vehicle 12 includes a receiver unit 13, which is designed to receive navigation signals. According to the illustration in FIG. 1, three satellites Sat1, Sat2 and Sat3 are available, wherein a first satellite Sat1 emits a first navigation signal Sig1, a second satellite Sat2 emits a second navigation signal Sig2, and a third satellite Sat3 emits a third navigation signal Sig3. The direct connecting line between the first satellite Sat1 and an antenna of the receiver unit 13 forms a first line of sight LoS1, and the connecting line between the second satellite Sat2 and the antenna of the receiver unit 13 forms a second line of sight LoS2. In the illustration according to FIG. 1, the first line of sight LoS1 and the second line of sight LoS2 are interrupted, and the first navigation signal Sig1 and of the second navigation signal Sig2 are each blocked here by the ceiling 16 of the garage 14. The connecting line between the third satellite Sat3 and the antenna of the receiver unit 13 forms a third line of sight LoS3, wherein, according to the illustration from FIG. 1, a direct sight connection between the antenna of the receiver unit 13 and the third satellite Sat3 is made possible by the entrance opening to the garage 14. In this way, the third navigation signal Sig3 can be received by the receiver unit 13 in the illustrated situation, while the first navigation signal Sig1 and the second navigation signal Sig2 cannot be received because these are shielded by the covering in the form of the ceiling 16 of the garage 14.

Advantageously, the first line of sight LoS1 and the second line of sight LoS2 are thus already ascertained before the motor vehicle 12 enters the garage 14, wherein the respective line of sight is assumed to be constant for a predefinable time period after the respective signal link is lost. Given the large distance of the satellites Sat1, Sat2, Sat3 and the orbital periods thereof around the earth of approximately 12 hours, this simplified illustration is sufficient for detecting that the motor vehicle 12 is entering the covered area in the form of the garage 14.

When the motor vehicle 12 approaches the garage 14, initially an interruption of the first navigation signal Sig1 to the first satellite Sat1 occurs, which is arranged in the driving direction, particularly in the direction of the driving motion x of the motor vehicle 12. Given the large distance between the satellites Sat1, Sat2, Sat3 and the motor vehicle 12 and the comparatively short period of the process of the motor vehicle 12 entering the garage 14, the lines of sight are considered to be substantially constant from the motor vehicle 12. The lines of sight are thus are parallel displaceable, together with the motor vehicle 12, in the horizontal direction, so that the first line of sight LoS1 is the first line of sight to be interrupted by the ceiling of the garage 14 when the motor vehicle 12 approaches the garage 14. The second line of sight LoS2 to the second satellite Sat2, which is situated essentially at the zenith perpendicularly over the motor vehicle 12, is the next one to be interrupted when the antenna of the receiver unit 13 passes the opening of the garage 14. According to the illustration from FIG. 1, the signal link to the third satellite Sat3 would likewise be interrupted once the motor vehicle 12 has traveled the remaining available distance within the garage 14 from the front edge of the motor vehicle 12 to the rear wall 18 of the garage 14.

Assuming that further satellites (not shown in FIG. 1) are orbiting in the vicinity of the third satellite Sat3, the different elevation angles with respect to the different satellites can allow a comparatively precise estimation of a height h of the entrance opening of the garage 14. The satellites can be, in particular, from different global navigation satellite systems (GPS, GLONASS, Galileo, for example).

The driving motion x of the motor vehicle 12 can be defined based on different vehicle parameters, for example, based on a vehicle longitudinal axis of the motor vehicle 12, a turning angle of the steerable wheels of the motor vehicle 12, a tangent to the trajectory traveled by the motor vehicle 12 when entering the garage 14, or an arbitrary combination with optional weighting of the individual parameter.

In addition to the receiver unit 13, the motor vehicle 12 includes an evaluation unit 15. Optionally, a prediction unit 17 may be provided, designed to predict, as a function of a predefinable target position within the garage 14, a decrease in the signal strength of the respective navigation signals Sig1, Sig2, Sig3 at the target position in relation to the signal strength of the respective navigation signals just before the motor vehicle 12 starts to assume the target position.

An impending entrance of the motor vehicle 12 into a tunnel 24 is shown in FIG. 2. The motor vehicle 12 is traveling on a roadway 21. An ascending first side wall 22 is located in front of the portal of the tunnel 24, to the right and next to the roadway 21, and an ascending left side 23 is present on the left side.

In addition to the first satellite Sat1, the second satellite Sat2, and the third satellite Sat3, moreover a fourth satellite Sat4 can be received in this illustration, which emits a fourth navigation signal Sig4 and forms a fourth line of sight LoS4 with the antenna of the receiver unit 13 of the motor vehicle 12. According to the illustration from FIG. 2, the first satellite Sat1 is located ahead based on the driving motion x of the motor vehicle 12. The second satellite Sat2 is located in a position to the right relative to the driving motion x of the motor vehicle 12. The third satellite Sat3 is located to the rear based on the driving motion x of the motor vehicle 12. The fourth satellite Sat4 is located on the left with respect to the driving motion x of the motor vehicle, in a position further ahead compared to the second satellite Sat2.

A vertical projection of the lines of sight LoS1, LoS2, LoS3, LoS4 onto the plane of the roadway 21, which is assumed to be horizontal, encloses a respective azimuth angle $\alpha 1$ (not shown), $\alpha 2$, $\alpha 3$ (not shown), $\alpha 4$ with the direction of the driving motion x of the motor vehicle 12. For the sake of clarity, only the second azimuth angle $\alpha 2$ and the fourth azimuth angle $\alpha 4$ are shown, wherein the second azimuth angle $\alpha 2$ in the selected reference system is approximately 90°, which means that the second satellite Sat2 is located in a so-called three o'clock position in relation to the motor vehicle 12. In the illustration, the fourth azimuth angle $\alpha 4$ is approximately 300°, so that the fourth satellite Sat4 is in the so-called ten o'clock position. With respect to the plane of the roadway 21, which, according to the definition, is assumed to be horizontal, and thus perpendicular to the zenith, where the zenith represents the normal direction with respect to the roadway plane, respective elevation angles $\varepsilon 1$ (not shown), $\varepsilon 2$, $\varepsilon 3$ (not shown), $\varepsilon 4$ result for the individual lines of sight LoS1, LoS2, LoS3, LoS4. Likewise, for the sake of clarity, of these only a second elevation angle $\varepsilon 2$ and a fourth elevation angle $\varepsilon 4$ in relation to the horizontal roadway plane are shown in FIG. 2.

When the motor vehicle 12 approaches the portal of the tunnel 24, the first line of sight LoS1 to the first satellite Sat1 is the first to be interrupted, whereby the first navigation signal Sig1 can no longer be received by the receiver unit 13 of the motor vehicle 12. Over the further course, the motor vehicle 12 travels between the first side wall 22 and the second side wall 23, which continuously ascend in terms of height toward the portal of the tunnel 24. As a function of the respective elevation angles $\varepsilon 2$, $\varepsilon 4$ of the second satellite Sat2 and the fourth satellite Sat4, the link to one of the two described satellites is interrupted as well. Assuming that the fourth satellite Sat4 is lower on the horizon than the second satellite Sat2, which is to say the fourth elevation angle $\varepsilon 4$ is smaller than the second elevation angle $\varepsilon 2$, the fourth line of sight LoS4 is the next line of sight to be interrupted. Subsequently, the second line of sight LoS2 is interrupted. Because the third satellite Sat3 is located in a direction substantially opposite to the driving direction of the motor vehicle 12, particularly the driving motion x of the motor vehicle 12, the interruption in the third line of sight LoS3 depends on a height of the portal of the tunnel 24 and a third elevation angle $\varepsilon 3$ (not shown in FIG. 2; see FIG. 3 in this regard).

In a manner that complements the illustration from FIG. 2, FIG. 3 shows the same scene from a lateral perspective. Here, a first elevation angle $\varepsilon 1$ is apparent, which is enclosed between the first line of sight LoS1 to the first satellite Sat1 and the plane of the roadway 21. To simplify matters, it is assumed that the illustration plane of FIG. 3 corresponds to a plane that is defined by the first satellite Sat1, the antenna of the receiver unit 13 of the motor vehicle 12, and the third satellite Sat3. As is apparent from FIG. 2, because the first satellite Sat1 is not located exactly ahead in the direction of the driving motion x, and accordingly the third satellite Sat3 is also not located exactly in a rear direction with respect to the driving motion x, the provided view onto the motor vehicle 12 is not exactly from the side, but oriented slightly obliquely in the representation of FIG. 3 so as to better illustrate the respective angles of elevation $\varepsilon 1$ and $\varepsilon 3$.

As illustrated in FIG. 3, if the third elevation angle $\varepsilon 3$ is 80°, for example, the third satellite Sat3 is in the vicinity of the zenith and is thus located within a conical region having a half opening angle of 20° around the zenith. When the third elevation angle ε3 assumes the value 70°, the third satellite Sat3 is located exactly at the boundary of such a defined conical region. In such a case, the link to the third satellite Sat3 is interrupted substantially immediately when the motor vehicle 12 passes the portal of the tunnel 24. However, if the third satellite Sat3 is located low on the horizon, causing the third elevation angle ε3 to be very small, such as 5°, the third navigation signal Sig3 can be received considerably longer, even inside the tunnel 24, provided the roadway 21 of the tunnel 24 continues in a rectilinear manner.

In the situation illustrated, the motor vehicle 12 has traveled just far enough toward the portal of the tunnel 24 for the link to the first satellite Sat1 to be interrupted. The representation in FIG. 3 can thus be considered to be analogous to the situation described with respect to FIG. 1, where the motor vehicle 12 starts to enter the garage 14, in which the first navigation signal Sig1 is interrupted, but the second navigation signal Sig2 and the third navigation signal Sig3 can still be received.

A model of the impairments to the links can be used and considered over time. In terms of entering garages or tunnels, a plausibility check of the covered area can then be carried out considerably more reliably by using a chronological sequence of the impairments to the links and by comparing it to the model.

The exemplary embodiments are provided to describe the invention, but are not intended to limit the invention. In particular, the manner in which the change in signal strength, over time, of the respective navigation signals Sig1, Sig2, Sig3, Sig4 in relation to the respective ascertained lines of sight LoS1, LoS2, LoS3, LoS4, is evaluated can take on any arbitrary design, without departing from the concepts of this disclosure.

It has been thus demonstrated above how a method for validating garage parking spaces can be designed for a controlled parking process by detecting ceilings using a GNSS.

The invention claimed is:

1. A position determination system for a motor vehicle for ascertaining whether the motor vehicle is located in a covered area of a structure, comprising:
   a receiver unit, configured to:
      receive navigation signals of a plurality of satellites of a global navigation satellite system; and
      detect a change in signal strength, over time, of the received navigation signals; and
   an evaluation unit, configured to:
      ascertain respective lines of sight from the motor vehicle to each of the plurality of satellites based on respective received navigation signals;
      evaluate the change in the signal strength, over time, of the respective received navigation signals relative to each of the respective ascertained lines of sight;
      correlate a driving motion of the motor vehicle with the respective ascertained lines of sight, wherein the driving motion of the motor vehicle is determined based on motor vehicle parameters, and wherein the motor vehicle parameters comprise a longitudinal axis of the motor vehicle, a turning angle of steerable wheels of the motor vehicle, and a tangent to a trajectory traveled by the motor vehicle;
      assign each of the plurality of satellites from which the respective navigation signals are received to a respective zone of a first zone, a second zone, or a third zone, as a function of the respective ascertained lines of sight; and
      identify an entrance into the structure when initially the signal strength of the respective received navigation signals of the plurality of satellites assigned to the first zone decreases and, over a further course, the signal strength of the respective received navigation signals of the plurality of satellites assigned to the second zone decreases.

2. The position determination system of claim 1, wherein the evaluation unit is further configured to:
   ascertain a respective azimuth angle of a position of the respective each of the plurality of satellites relative to the motor vehicle;
   ascertain a respective angular difference between the respective azimuth angle and a driving azimuth angle.

3. The position determination system of claim 1, wherein the evaluation unit is further configured to:
   identify that the motor vehicle is entering the covered area when a decrease in the signal strength by a predefinable factor of at least one of the plurality of satellites is detected.

4. The position determination system of claim 3, wherein the at least one of the plurality of satellites is located in a vicinity of a zenith, relative to a position of the motor vehicle.

5. The position determination system of claim 4, wherein the at least one of the plurality of satellites is located within a conical region having a half opening angle of 30° around the zenith.

6. The position determination system of claim 4, wherein the at least one of the plurality of satellites is located within a conical region having a half opening angle of 20° around the zenith.

7. The position determination system of claim 1, wherein the evaluation unit is configured to:
   ascertain how far the motor vehicle has already driven into the structure.

8. The position determination system of claim 1, wherein the evaluation unit is further configured to:
   ascertain a height of an entrance opening of the structure after the motor vehicle has completely entered through the entrance opening of the structure.

9. The position determination system of claim 1, wherein the evaluation unit is further configured to identify an entrance into a tunnel.

10. A motor vehicle comprising a position determination system for ascertaining whether the motor vehicle is located in a covered area of a structure, comprising:
   a receiver unit, configured to:
      receive navigation signals of a plurality of satellites of a global navigation satellite system; and
      detect a change in signal strength, over time, of the received navigation signals; and
   an evaluation unit, configured to:
      ascertain respective lines of sight from the motor vehicle to each of the plurality of satellites based on respective received navigation signals;
      evaluate the change in the signal strength, over time, of the respective received navigation signals relative to each of the respective ascertained lines of sight;
      correlate a driving motion of the motor vehicle with the respective ascertained lines of sight, wherein the driving motion of the motor vehicle is determined based on motor vehicle parameters, and wherein the motor vehicle parameters comprise a longitudinal axis of the motor vehicle, a turning angle of steerable wheels of the motor vehicle, and a tangent to a trajectory traveled by the motor vehicle;

assign each of the plurality of satellites from which the respective navigation signals are received to a respective zone of a first zone, a second zone, or a third zone, as a function of the respective ascertained lines of sight; and identify an entrance into the structure when initially the signal strength of the respective received navigation signals of the plurality of satellites assigned to the first zone decreases and, over a further course, the signal strength of the respective received navigation signals of the plurality of satellites assigned to the second zone decreases.

11. The motor vehicle of claim 10, wherein the evaluation unit is further configured to:

ascertain a respective azimuth angle of a position of the respective each of the plurality of satellites relative to the motor vehicle;

ascertain a respective angular difference between the respective azimuth angle and a driving azimuth angle.

12. The motor vehicle of claim 10, wherein the evaluation unit is further configured to:

identify that the motor vehicle is entering the covered area when a decrease in the signal strength by a predefinable factor of at least one of the plurality of satellites is detected.

13. The motor vehicle of claim 12, wherein the at least one of the plurality of satellites is located in a vicinity of a zenith, relative to a position of the motor vehicle.

14. The motor vehicle of claim 10, wherein the evaluation unit is configured to:

ascertain how far the motor vehicle has already driven into the structure.

15. The motor vehicle of claim 10, wherein the evaluation unit is further configured to:

ascertain a height of an entrance opening of the structure after the motor vehicle has completely entered through the entrance opening of the structure.

16. The motor vehicle of claim 10, wherein the evaluation unit is further configured to identify an entrance into a tunnel.

17. The motor vehicle of claim 10, further comprising:

an environmental sensor having a horizontal detection characteristic for providing environmental data, the environmental sensor configured to:

detect objects located in a horizontal direction with respect to the motor vehicle, wherein the evaluation unit is further configured to:

merge the respective ascertained lines of sight and the signal strength of each of the plurality of satellites with the environmental data; and evaluate the environmental data combined with the respective ascertained lines of sight to each of the plurality of satellites and a respective progression of the signal strength, over time, of the respective received navigation signals.

18. A method for ascertaining whether a motor vehicle is located in a covered area of a structure, comprising:

receiving navigation signals of a plurality of satellites of a global navigation satellite system;

detecting a change in signal strength, over time, of the received navigation signals;

ascertaining respective lines of sight from the motor vehicle to each of the plurality of satellites based on respective received navigation signals;

evaluating the change in the signal strength, over time, of the respective received navigation signals relative to each of the respective ascertained lines of sight; and correlating a driving motion of the motor vehicle with the respective ascertained lines of sight, wherein the driving motion of the motor vehicle is determined based on motor vehicle parameters, wherein the motor vehicle parameters comprise a longitudinal axis of the motor vehicle, a turning angle of steerable wheels of the motor vehicle, and a tangent to a trajectory traveled by the motor vehicle, and wherein the ascertaining comprises:

assigning, by an evaluation unit, each of the plurality of satellites from which navigation signals are received to a respective zone of a first zone, a second zone, and a third zone, as a function of the respective ascertained lines of sight; and identifying an entrance into the structure when initially the signal strength of the respective received navigation signals of the plurality of satellites assigned to the first zone decreases and, over a further course, the signal strength of the respective received navigation signals of the plurality of satellites assigned to the second zone decreases.

19. The method of claim 18, further comprising predicting, as a function of a predefinable target position within the structure, a decrease in the signal strength of the respective received navigation signals at the predefinable target position in relation to the signal strength of the respective received navigation signals just before the motor vehicle starts to assume the predefinable target position.

* * * * *